M. O. SWEIVEN.
SPRING TIRE.
APPLICATION FILED NOV. 14, 1918.
1,348,522.
Patented Aug. 3, 1920.
2 SHEETS—SHEET 1.
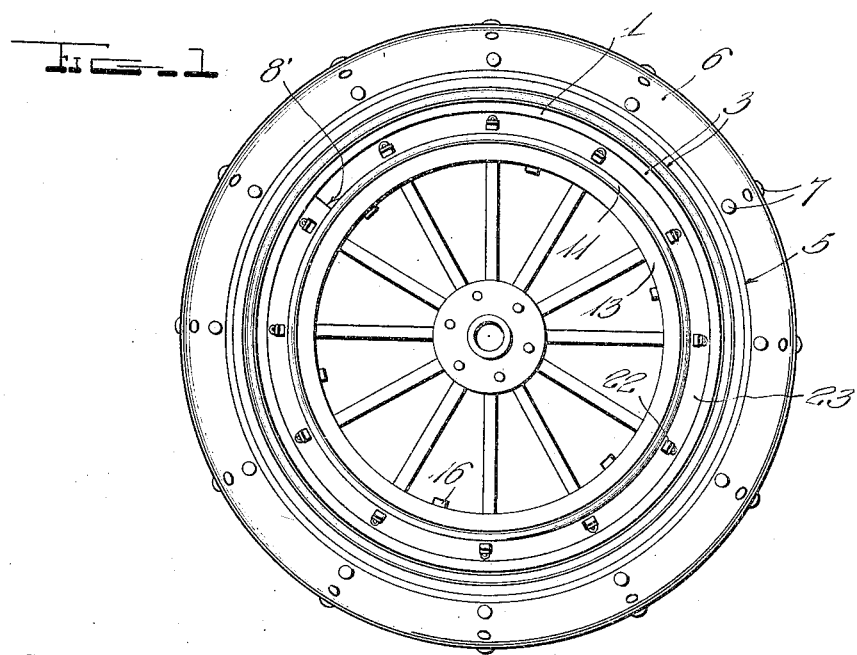
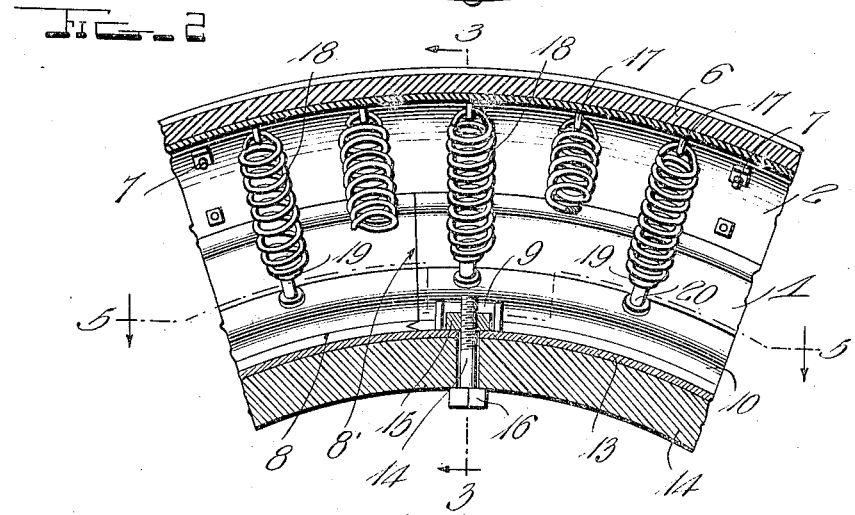
Witness
Inventor
Martin O. Sweiven
By H. B. Willson & Co
Attorneys

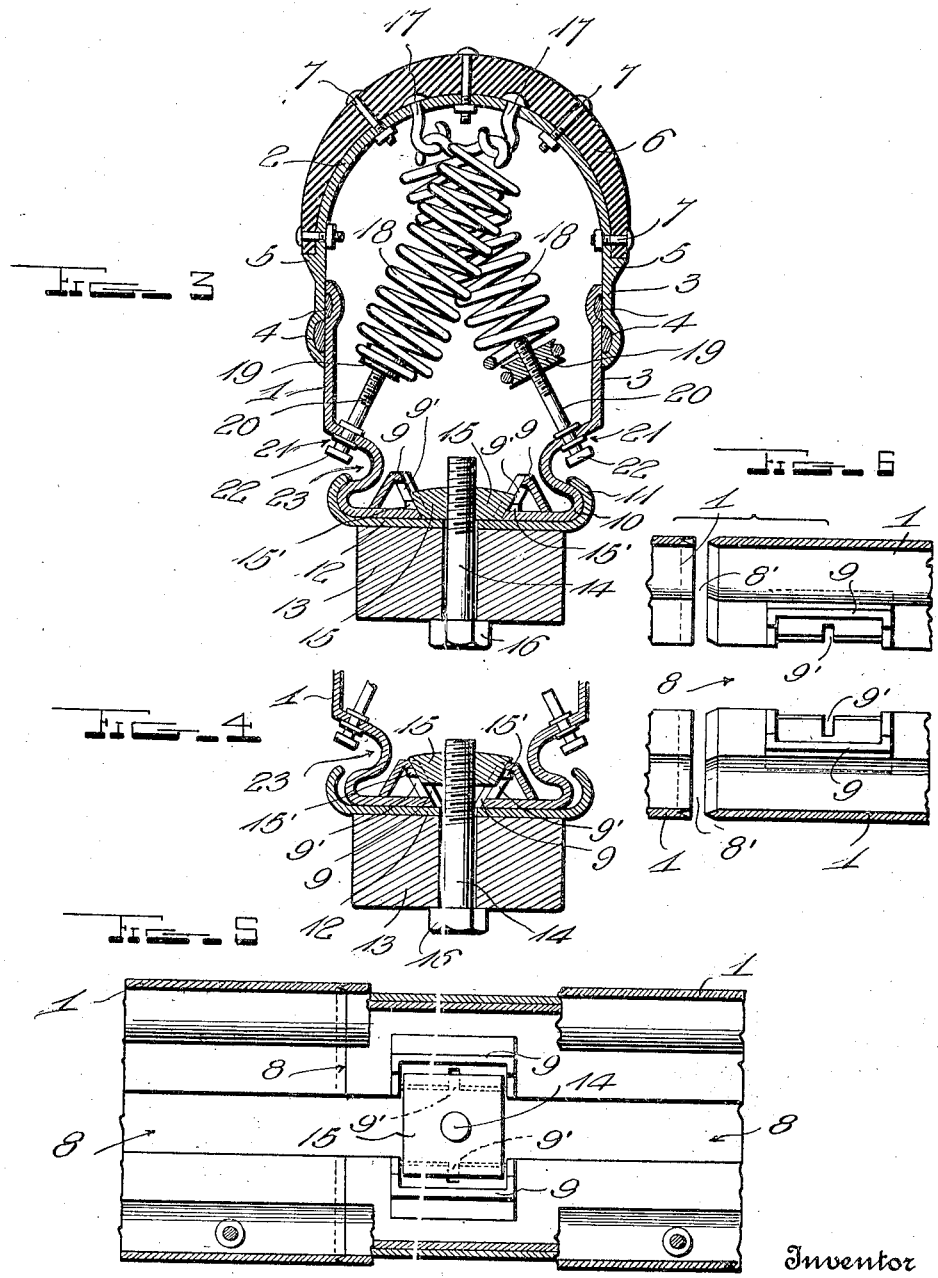

UNITED STATES PATENT OFFICE.

MARTIN O. SWEIVEN, OF OLIVIA, MINNESOTA.

SPRING-TIRE.

1,348,522.  Specification of Letters Patent.  Patented Aug. 3, 1920.

Application filed November 14, 1918. Serial No. 262,565.

*To all whom it may concern:*

Be it known that I, MARTIN O. SWEIVEN, a citizen of the United States, residing at Olivia, in the county of Renville and State of Minnesota, have invented certain new and useful Improvements in Spring-Tires; and I do declare the following to be a full, clear, and exact description of the invention, such as will enable others skilled in the art to which it appertains, to make and use the same.

My invention has for its object to provide a highly efficient and durable spring tire which will possess substantially the advantages of the pneumatic tire without the disadvantages thereof, provision being made whereby the tension of the springs may be varied according to the weight of the machine, and a novel arrangement of parts being provided for securing the tire on the rim, and for permitting easy removal thereof.

With the foregoing object in view, the invention resides in the novel features of construction hereinafter fully described and claimed and shown in the accompanying drawing.

Figure 1 of the drawing represents a side elevation of the tire applied to an automobile wheel.

Fig. 2 is an enlarged circumferential vertical section of a portion of the tire and wheel.

Fig. 3 is a transverse section on the plane of the line 3—3 of Fig. 2, the tire being clamped in position upon the rim.

Fig. 4 is a view similar to a portion of Fig. 3 illustrating the manner in which the tire is contracted for removal from or application to the rim.

Fig. 5 is a circumferential section on the plane indicated substantially by the line 5—5 of Fig. 2.

Fig. 6 is a view somewhat similar to Fig. 5 but illustrating the manner in which the tire may be expanded for passage over the rim beads in applying or removing.

In the drawings above briefly described, the numerals 1 and 2 designate an inner and an outer channel-shaped metal ring coöperating in forming the tire casing, the side flanges 3 of the two rings being disposed in overlapped sliding relation and provided with suitable packings 4 to prevent the entrance of grit, dust, mud, etc., and insure silent operation. The side flanges of the outer ring 2 are provided with external ribs 5 against which a tread 6 of rubber or any other preferred material abuts at its edges, said tread being secured to the ring by bolts or rivets 7. The inner ring 1 is split transversely at 8′ and circumferentially at its center as seen at 8 and spaced portions thereof along the sides of the split 8 are provided with opposed, inwardly converging, channel-shaped flanges 9 having slots 9′ in their bottoms. The ring 1 is stamped at the inner portion of its flanges 3 to provide beads 10 adapted to engage the usual hooks or bead rings 11 of a clencher rim 12, the latter being of the usual construction and mounted on the felly 13 in any preferred manner. Radial bolts 14 pass through the felly 13 and rim 12 and are provided on their outer ends with wedge-like nuts 15 engaging the channeled flanges 9 so that when the beads 16 of said bolts are turned properly, the wedge-like nuts will expand the inner ring 1 to snugly engage the beads 10 with the bead rings 11 (see Fig. 3). By removing the bolts, the ring 1 may be contracted for detachment whenever required, the nuts 15 then moving to the widely spaced outer edges of the flanges 9 and being held against accidental displacement or disengagement from their seats by pins 15′ fitting in the slots 9′. The split 8′ permits contraction of the ring 1 to permit it to be inserted in the outer ring 2, and also permits of its expansion for passage over the flanges 11, and said split is preferably as shown to insure a tight joint which will exclude dirt and will not warp.

Spring anchors 17, preferably in the form of hooks are secured to the outer ring 2 along opposite sides of its tread portion, and the outer ends of crossed coiled suspension springs 18 are connected with said anchors. The inner ends of the springs 18 have nuts 19 secured therein. Adjusting screws 20 are threaded in the nuts to vary the tension of the springs, said screws passing through the side flanges 3 of the inner ring 1 and being swiveled thereto at 21. The outer ends of the screws 20 are provided with heads 22 whereby they may be adjusted from the exterior of the tire, and these heads are confined in annular grooves 23 formed in the outer sides of flanges 3 by stamping the latter as shown. By the provision of the screws the tension of the springs 18 may be increased or decreased according to the weight of the machine upon which the tire is used, and due to their arrangement, the springs 18 tend to contract the section 1 transversely when the ends 15 are released and thus increase the ease with which the tire may be removed.

In assembling the device, the bolts 20 having been previously journaled or swiveled in the openings indicated at 21, the springs 17 are now connected to these bolts by their nuts 19, and then the annular halves of the inner section or rim-engaging section are passed through the circular openings defined by the inner circumference of the tread member 2. This may be accomplished by contracting the rim-engaging half-sections respectively. However, it is not essential to contract these sections, owing to the fact that they are laterally split at 8', and one end of each half-section may be inserted in the tread section, and this end can be followed by the intermediate portion, and then by the other end at the split 8'. Having thus inserted the half-sections the outer ends of the springs may be engaged with the hooks 17, and the bolts 20 may be turned to tension the springs 18 only enough to prevent their disengagement from the hooks 17 and to hold their inner edges adjacent to one another, as shown in Fig. 4, whereupon they may be sprung apart sufficiently to permit the nuts 15 to be seated in the position shown in Fig. 4, their pins or studs 15' being disposed in the outer ends of the slots 9'. When these parts of the tire are thus assembled, they may be placed on the rim having the flanges 11, the inner section being expanded for permitting it to pass over one of the flanges 11. By tightening the bolts 20 prior to placing the tire on the rim, these springs not only hold the nuts 15 securely in their seats, but aid in the expansion of the inner section so that it may be passed over the flange 11 with comparative ease. After the tire is seated on the rim, any appropriate means (not shown) may be employed for forcing its ends together at the split 8, and in thus bringing the ends of the half-sections together, they are caused to fit snugly against the wheel-rim. Before thus contracting the half-sections, however, one of the bolts 14, preferably the one diametrically opposite the split 8', should be engaged with its nut 15 thus insuring that the other nuts 15 are substantially registering with the holes in the felly 13 through which the bolts 14 extend, and by using a draft or other appropriate tool, the nuts 15 may be so alined with the holes in the rim and felly that all the bolts 14 may be engaged with their nuts 15, and it is only necessary to tighten the bolts 14 in order to spread the half-sections so that their beads 10 engage with the beads or flanges 11.

The improved tire is of extremely simple and comparatively inexpensive nature, yet it will be highly efficient and durable, possessing approximately all advantages of the pneumatic tire without the well known disadvantages thereof. Since probably the best results are obtained from the details shown and described, they are by preference followed, but within the scope of the invention as claimed, considerable latitude is allowed for making such minor changes as occasion may dictate.

I claim:

1. A tire comprising an annular tread section, a separate laterally expansible rim-engaging section adapted to seat upon the usual channeled rim, and to support said tread section in movable relation thereto, means for laterally expanding said rim-engaging section to secure it upon the rim, and cushioning means disposed between and connected to said tread section and rim-engaging section for controlling the relative movement of said tread section and rim-engaging section and being effective to transversely contract the latter when said expanding means is released.

2. In a tire, a tread section, a metallic rim-engaging section split circumferentially in its rim-engaging side and supporting the tread section, a channeled rim upon which said rim-engaging section is mounted, bolts extending radially through said rim and through the split of said rim-engaging section, wedge-like nuts on the inner ends of said bolts, and circumferentially spaced pairs of inwardly converging channel-shaped flanges, the flanges of each pair being on opposite sides of said split and united with the respective halves of the rim-engaging section, the channels of each pair of said flanges receiving opposite ends of the contiguous nuts, said flanges, nuts and bolts coacting to expand the casing transversely to secure it upon the rim.

3. In a structure as specified in claim 3, said channel shaped flanges having central slots extending longitudinally of their channels and in the direction of convergence of the flanges, said nuts having pins extending into said slots to prevent accidental disengagement of the nuts while permitting them to be moved radially to their effective and ineffective positions.

In testimony whereof I have hereunto set my hand.

MARTIN O. SWEIVEN.